US012218773B2

(12) United States Patent
Jensen et al.

(10) Patent No.: US 12,218,773 B2
(45) Date of Patent: Feb. 4, 2025

(54) VIDEO CONFERENCE ACCELERATION

(71) Applicant: Zoom Video Communications, Inc., San Jose, CA (US)

(72) Inventors: Patrick Jensen, Fresno, CA (US); Michael White, Alpine, UT (US)

(73) Assignee: Zoom Video Communications, Inc., San Jose, CA (US)

( * ) Notice: Subject to any disclaimer, the term of this patent is extended or adjusted under 35 U.S.C. 154(b) by 119 days.

(21) Appl. No.: 17/202,615

(22) Filed: Mar. 16, 2021

(65) Prior Publication Data

US 2022/0303150 A1 Sep. 22, 2022

(51) Int. Cl.
*H04L 65/1093* (2022.01)
*H04L 12/18* (2006.01)

(52) U.S. Cl.
CPC ...... *H04L 12/1827* (2013.01); *H04L 12/1822* (2013.01); *H04L 12/1863* (2013.01)

(58) Field of Classification Search
CPC ............. H04L 65/1093; H04L 65/4038; H04L 65/1033; H04L 65/4046; H04L 65/1073
USPC ......................................................... 709/204
See application file for complete search history.

(56) References Cited

U.S. PATENT DOCUMENTS

| | | | |
|---|---|---|---|
| 10,264,129 B2 | 4/2019 | Bischoff et al. | |
| 10,728,394 B1* | 7/2020 | LaFata | H04M 3/56 |
| 2008/0005246 A1* | 1/2008 | VanBuskirk | H04L 65/104 |
| | | | 709/204 |
| 2016/0165184 A1* | 6/2016 | Aaron | H04L 12/1822 |
| | | | 348/14.08 |
| 2020/0302344 A1* | 9/2020 | Just | G06F 21/34 |

FOREIGN PATENT DOCUMENTS

| | | |
|---|---|---|
| CN | 204652550 U | 9/2015 |
| WO | 2007044562 A1 | 4/2007 |

OTHER PUBLICATIONS

PCT Application No. PCT/US2022/018443, "International Search Report and Written Opinion", May 18, 2022, 12 pages.
International Application No. PCT/US2022/018443 , "International Preliminary Report on Patentability", Sep. 28, 2023, 9 pages.

* cited by examiner

*Primary Examiner* — Sibte H Bukhari
(74) *Attorney, Agent, or Firm* — Kilpatrick Townsend & Stockton LLP

(57) ABSTRACT

One example method for video conference acceleration includes connecting, by an accelerator device, to a local area network ("LAN"), the LAN in communication with a wide area network ("WAN"); transmitting, via the LAN and the WAN, registration information to a video conference provider, the registration information identifying network configuration information; receiving, from the video conference provider via the WAN and the LAN, an identifier corresponding to the accelerator device; after receiving the identifier, receiving, from a first client device, a request to access a meeting; determining whether the meeting is available at the accelerator device; and in response to determining that the meeting is available at the accelerator device, transmitting access information to the first client device.

20 Claims, 12 Drawing Sheets

VIDEO CONFERENCE ACCELERATION

FIELD

The present application generally relates to hosting video conferences and more particularly relates to systems and methods for video conference acceleration.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for video conference acceleration.

One example method for video conference acceleration includes connecting, by an accelerator device, to a local area network ("LAN"), the LAN in communication with a wide area network ("WAN"); transmitting, via the LAN and the WAN, registration information to a video conference provider, the registration information identifying network configuration information; receiving, from the video conference provider via the WAN and the LAN, an identifier corresponding to the accelerator device; after receiving the identifier, receiving, from a first client device, a request to access a meeting; determining whether the meeting is available at the accelerator device; and in response to determining that the meeting is available at the accelerator device, transmitting access information to the first client device.

Another example method includes accessing, using a computing device, a local area network ("LAN"); discovering an accelerator device connected to the LAN; transmitting, to the accelerator device via the LAN, a request to access meeting; and connecting, via the LAN, to the meeting at the accelerator device based on a response from the accelerator device.

A further example method includes receiving, from a client device via a wide area network ("WAN") by a video conferencing provider, a request to access a meeting; identifying one or more candidate host devices for the meeting based on network information received from the client device, the candidate host devices including an event accelerator; and transmitting information identifying the one or more candidate host devices to the client device.

One example system includes a non-transitory computer-readable medium; a communications interface; and one or more processors in communication with the non-transitory computer-readable medium, the one or more processors configured to execute processor-executable instructions stored in the non-transitory computer-readable medium to connect to a local area network ("LAN"), the LAN in communication with a wide area network ("WAN"); transmit, via the LAN and the WAN, registration information to a video conference provider, the registration information identifying network configuration information; receive, from the video conference provider via the WAN and the LAN, an identifier corresponding to an accelerator device; after receipt of the identifier, receive, from a first client device, a request to access a meeting; determine whether the meeting is available at the accelerator device; and in response to a determination that the meeting is available at the accelerator device, transmit access information to the first client device.

Another example system includes a non-transitory computer-readable medium; a communications interface; and one or more processors in communication with the non-transitory computer-readable medium, the one or more processors configured to execute processor-executable instructions stored in the non-transitory computer-readable medium to access a local area network ("LAN"); discover an accelerator device connected to the LAN; transmit, to the accelerator device via the LAN, a request to access a meeting; and connect, via the LAN, to the meeting at the accelerator device based on a response from the accelerator device.

A further example system includes a non-transitory computer-readable medium; a communications interface; and one or more processors in communication with the non-transitory computer-readable medium, the one or more processors configured to execute processor-executable instructions stored in the non-transitory computer-readable medium to receive, from a client device via a wide area network ("WAN") by a video conferencing provider, a request to access a meeting; identify one or more candidate host devices for the meeting based on network information received from the client device, the candidate host devices including an event accelerator; and transmit information identifying the one or more candidate host devices to the client device.

One example non-transitory computer-readable medium includes processor-executable instructions configured to cause one or more processors to connect to a local area network ("LAN"), the LAN in communication with a wide area network ("WAN"); transmit, via the LAN and the WAN, registration information to a video conference provider, the registration information identifying network configuration information; receive, from the video conference provider via the WAN and the LAN, an identifier corresponding to an accelerator device; after receipt of the identifier, receive, from a first client device, a request to access a meeting; determine whether the meeting is available at the accelerator device; and in response to a determination that the meeting is available at the accelerator device, transmit access information to the first client device.

Another example non-transitory computer-readable medium includes processor-executable instructions configured to cause one or more processors to access a local area network ("LAN"); discover an accelerator device connected to the LAN; transmit, to the accelerator device via the LAN, a request to access a meeting; and connect, via the LAN, to the meeting at the accelerator device based on a response from the accelerator device.

A further example non-transitory computer-readable medium includes processor-executable instructions configured to cause one or more processors to receive, from a client device via a wide area network ("WAN") by a video conferencing provider, a request to access a meeting; identify one or more candidate host devices for the meeting based on network information received from the client device, the candidate host devices including an event accelerator; and transmit information identifying the one or more candidate host devices to the client device.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
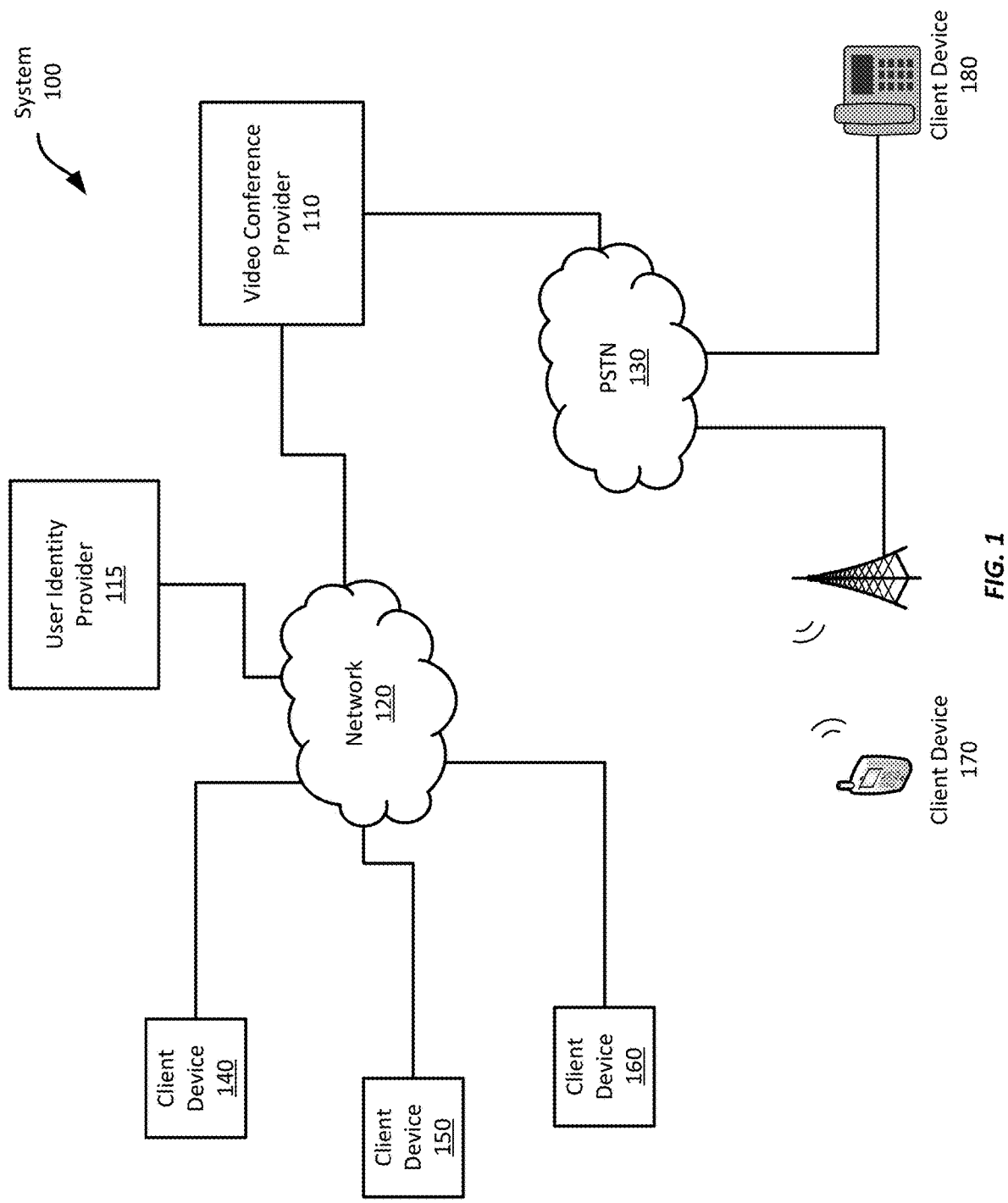
FIGS. 1-3 show example systems for video conference acceleration.

Examples are described herein in the context of systems and methods for video conference acceleration. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference systems can impose significant strain on communications networks that carry video and audio streams (or collectively "multimedia streams") for the various video conferences (or "meetings") handled by the video conference system. For example, each participant may provide at least one audio stream and one video stream, and may then receive multiple audio and video streams from various other participants in the meeting. Depending on the quality or resolution of the audio or video data, the amount of data carried in each stream can easily reach multiple megabits ("Mb") of data per second per participant. When a large number of devices all participate in the same video conference, the video conference can generate hundreds of Mbs or even gigabits ("Gb") per second worth of audio and video data, as well as related side channel control information. Further, in some video conferencing systems, some participants may provide multiple streams of audio and video, each at a different resolution or quality level, which may further affect network utilization.

If each client device is located at a different place and each client device communicates with the video conference provider over their own respective network connection, e.g., internet connection, it will generate substantial network usage at the video conference provider; however, each individual participant's network will only transfer the data for that particular participant and any incoming multimedia streams. This scenario is typically handled by the video conference provider having substantial network bandwidth to accommodate a large number of simultaneous meetings and participants, or by having a significant number of data centers that can divide up the bandwidth needed for the various video conferences hosted by the video conference provider.

However, in some cases, a large number of participants may all be located in the same building, such as in a hotel or a conference center. In such a scenario, each participant may connect to the available communications network, e.g., a local area network ("LAN"), such as by using a Wi-Fi connection or a wired Ethernet connection. If each participant provides a video and audio stream (each "upstream" data) and, in turn, receives video and audio streams from multiple different participants (each "downstream" data), the LAN will need to transfer all of the upstream data from the participants to an external network, such as the internet or other wide area network ("WAN"), and on to the video conference provider. In addition, the LAN will receive a significant amount of downstream data, such as multimedia streams, from the video conference provider via its WAN connection and then distribute that data to the various client devices that are participating in the video conference.

In such a scenario, the LAN itself will experience significant bandwidth usage. In addition, the WAN connection will also experience significant bandwidth usage, both upstream and downstream. However, locations such as hotels and conference centers typically do not have high-performance, high-bandwidth LANs or WAN connections. Instead, such locations typically expect their guests to have relatively low bandwidth requirements, such as for checking email or browsing the internet. Consequently, they may be easily overwhelmed if a large number of guests simultaneously attend a video conference (or multiple video conferences).

Examples according to this disclosure can help address some of these issues. For example, a video conferencing system may include a video conference accelerator installed at a location where large numbers of client devices may attempt to connect to one or more video conferences. The video conference accelerator (or "accelerator") may connect to the available LAN at the event location, such as via a Wi-Fi or wired Ethernet connection and obtain a local network address, e.g., an internet-protocol ("IP") address. It may then contact the video conference provider via the LAN and the WAN connection provided by the location and identify itself to the video conference provider, such as by supplying a unique token assigned to the accelerator by the video conference provider. The video conference provider may then record the WAN address from which the communication originated and request (or otherwise obtain) the accelerator's LAN network address. The video conference provider may then create a record for the accelerator and include its LAN and WAN network addresses in the record.

At a later time, if a client device attempts to access a meeting at the location using the LAN (a "local client"), it will contact the video conference provider to access the meeting. The video conference provider will request (or otherwise obtain) the client device's LAN network address as well as the WAN network address the communication originated from. The video conference provider can then determine whether an accelerator is available at the same location. If so, the video conference provider responds to the client device with the network address for the accelerator as being one of several available hosts for the meeting.

After receiving the response from the video conference provider, the client device communicates with the identified available hosts and determines a quality of connection, e.g., latency, jitter, dropped packets, etc., to each host. Since the accelerator is connected to the same LAN as the client device, the quality of the connection will almost always exceed the quality of the connection to any other available host. Thus, the client device will most likely contact the accelerator and request access to the meeting (or request to host the meeting, if the meeting host is using the client device). The accelerator can then provide access information for the meeting to the client device, e.g., information about one or more multimedia streams, host information, participant information, etc., to allow the client device to join (or host) the meeting.

Additional client devices at the location will proceed through the same process before (most likely) communicating with the accelerator to join the meeting. The accelerator then manages the routing of multimedia streams to different participants within the location using the LAN. Thus, network bandwidth on the LAN will be consumed by the various multimedia streams, however, because the streams stay within the LAN, the WAN connection remains relatively unaffected.

Further, if client devices external to the location (or "external clients") attempt to join the meeting, they will connect to the video conference provider, which will in turn connect to the accelerator to send and receive (or "bridge") multimedia streams between the external clients and the accelerator. However, to prevent saturation of the WAN connection, the accelerator may only provide a limited number of multimedia streams from the LAN and may only accept a limited number of multimedia streams from the external participants. Because participants typically can only view a limited number of participants at a time, the accelerator and the video conference provider can coordinate to provide relevant multimedia streams to external participants (or from external participants) and avoid overwhelming the WAN connection.

Examples according to this disclosure can help alleviate potential network bandwidth issues in locations that might host large numbers of client devices that may connect to a video conference. Accelerator devices may significantly reduce the strain on a WAN connection provided by such locations when clients access a video conference, but without impacting the participants' ability to join video conferences. Further, in some examples, the accelerator device may be easily managed by the video conference provider and thus, the locations may not need to employ IT staff to help manage the location's video conference capabilities.

This illustrative example is given to introduce the reader to the general subject matter discussed herein and the disclosure is not limited to this example. The following sections describe various additional non-limiting examples and examples of systems and methods for video conference acceleration.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
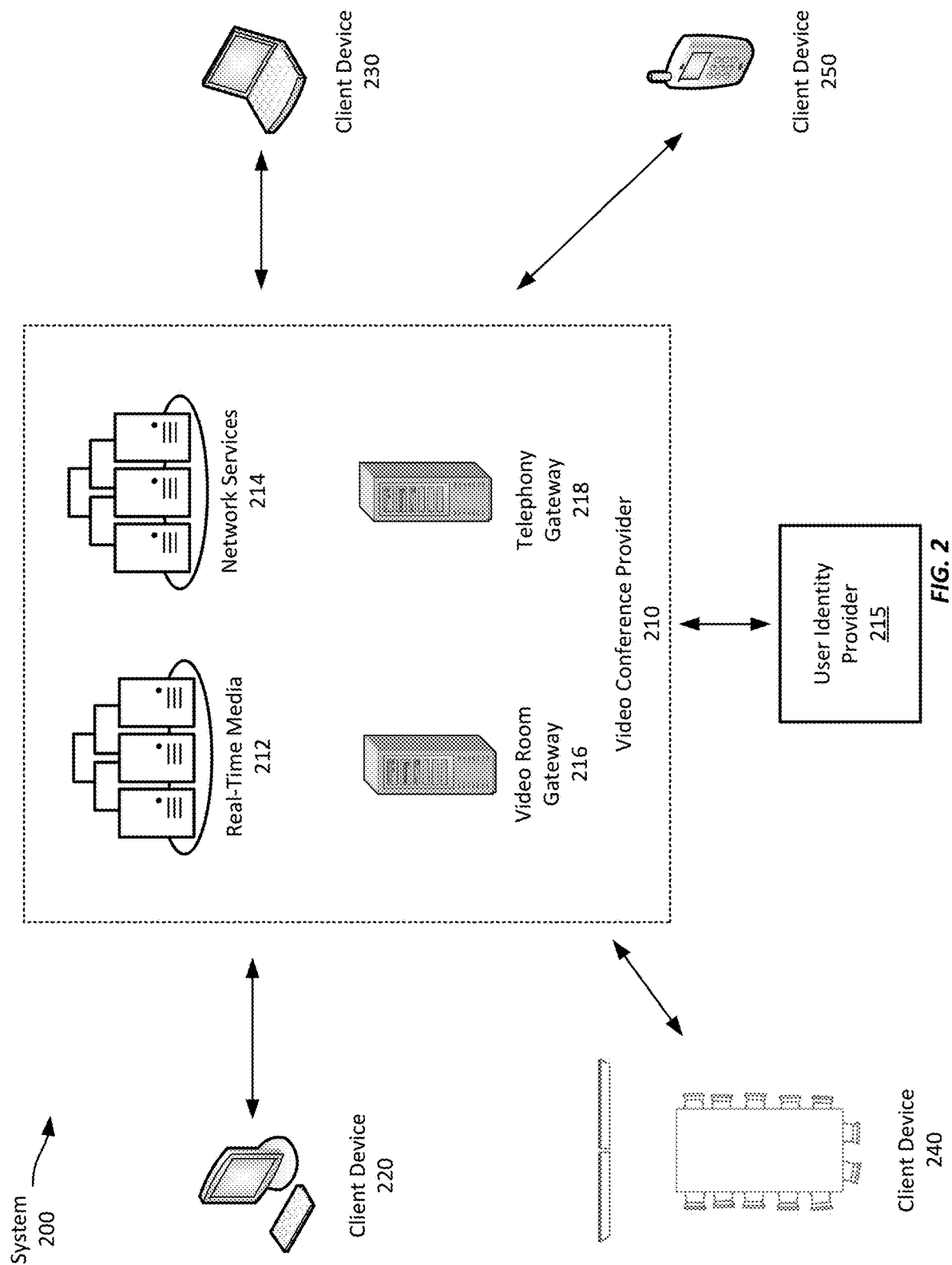

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider 110 may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference provider 110 then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started, or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency, and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
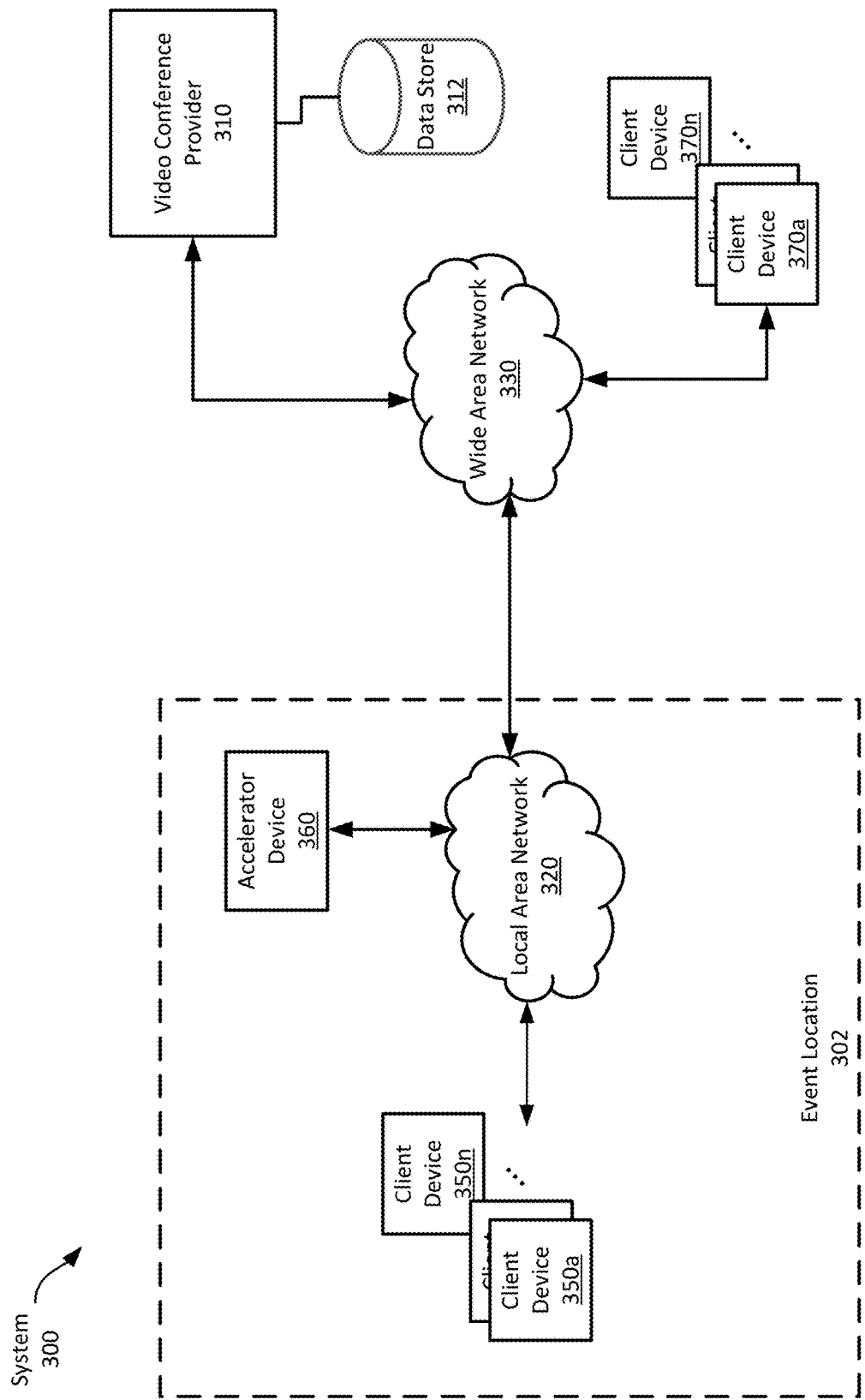

Referring now to FIG. 3, FIG. 3 shows an example system 300 for video conference acceleration. To help provide video conference services to client devices 350a-350n (n represents any number of client devices) at an event location 302, an accelerator device 360 has been installed at the event location 302 and connected to the event location's LAN 320. Once the accelerator device 360 has begun operation, it establishes communications with the video conference provider 310 via the LAN 320 and the WAN 330.

Figure 12:
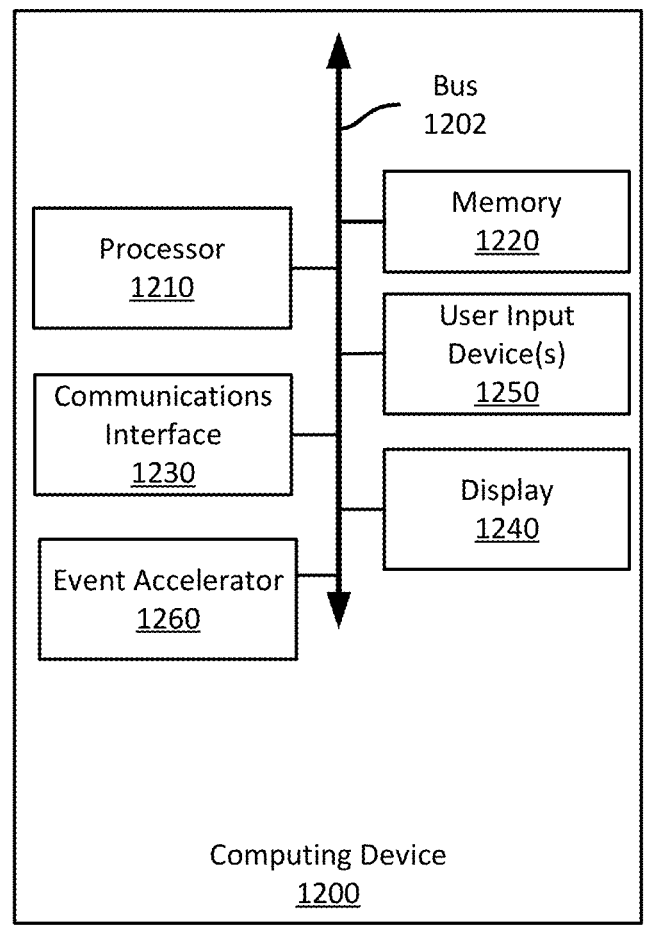
FIG. 12 shows an example computing device suitable for use with various systems and methods according to the present disclosure.

In this example, the accelerator device 360 is a suitable computing device, such as the computing device 1200 illustrated in FIG. 12. However, any suitable computing device may be employed according to different examples. The accelerator device 360 executes processor-executable instructions to receive requests to host or join meetings from one or more client devices 350a-n, to register with a video conference provider 310, to coordinate hosting meetings with the video conference provider 310, to receive and provide multimedia streams to meeting participants' client devices 350a-n, and related functionality. A more detailed illustration and description of data flow and processing in an accelerator device is found below with respect to FIG. 4.

In this example, the LAN 320 includes one or more wireless access points as well as one or more wired network access ports usable by various client devices 350a-n and the accelerator device 360 to communicate via the LAN 320. Any suitable networking protocol may be employed to provide the LAN 320, such as Ethernet, any 802.xx wired or wireless protocol, etc. The connection between the LAN 320 and the WAN 330 may be any suitable connection, such as a fiber connection, a cable modem connection, any T-carrier connection (e.g., T-1, etc. connections), etc. The WAN 330 may be any wide area network that provides network communications between the LAN 320 and the video conference provider 310, such as the internet.

When the accelerator device 360 initially communicates with the video conference provider 310, it provides information to the video conference provider 310 to register the accelerator device 360 with the video conference provider 310. Such information may include a LAN network address; e.g., an IP address, a server name (if the LAN supports name resolution such as a domain name system ("DNS")); or information about the accelerator device 360, e.g., a location or device name, etc. The accelerator device 360 may also provide configuration information for one or more software components installed on the accelerator device 360. Such configuration information may enable the video conference provider 310 to determine whether any configuration updates are needed and to provide such updates, if required.

When the video conference provider 310 receives the information from the accelerator device 360, it establishes a record in a data store 312 for the accelerator device 360. It then generates a token for the accelerator device 360, which can be used by the accelerator device 306 to identify itself to the video conference provider 410. Any suitable type of token may be used according to different examples, e.g., a verifiable procedurally generated alphanumeric sequence (such as may be used for product activation of consumer software) or a cryptographic key of a key-pair assigned to the accelerator device 360 by the video conference provider 310. It then updates the record to include the token and some or all of the information received from the accelerator device 360, such as its LAN network address, its LAN network name, configuration information, etc. In addition, the video conference provider 310 may obtain other information from the accelerator device 360, such as its WAN network address, e.g., based on inbound network packets received from the accelerator device 360. Such information may then be stored in a corresponding record (or records) in the data store 312. The video conference provider 310 then responds to the accelerator device 360 with the token and any updates, if needed, and then indicates that the accelerator device 360 has been registered and may begin waiting for meeting requests from client devices.

Once the accelerator device 360 is configured and registered with the video conference provider 310, internal client devices 350a-n may discover the accelerator device 360 and access meeting using it. Discovery may be accomplished by first communicating with the video conference provider 310, such as by accessing a URL that identifies the video conference provider 310, which may then provide information about the accelerator device 310 to the requesting the client device 350a-n. In some examples, client devices may be configured to transmit network communications onto a LAN to request a response from any accelerator devices that may be connected to it, e.g., by using a multi-cast protocol. Other example LANs may employ a name service, e.g., domain name service ("DNS"), that may allow client devices to search for accelerator devices by name within the LAN. Using one or more of these techniques, client devices may be able to discover an available accelerator device on a LAN.

The example system 300 also includes one or more external client devices 370a-n that may access meetings hosted by the video conference provider 310 or the accelerator device 360, as will be described in more detail below.

Figure 4:
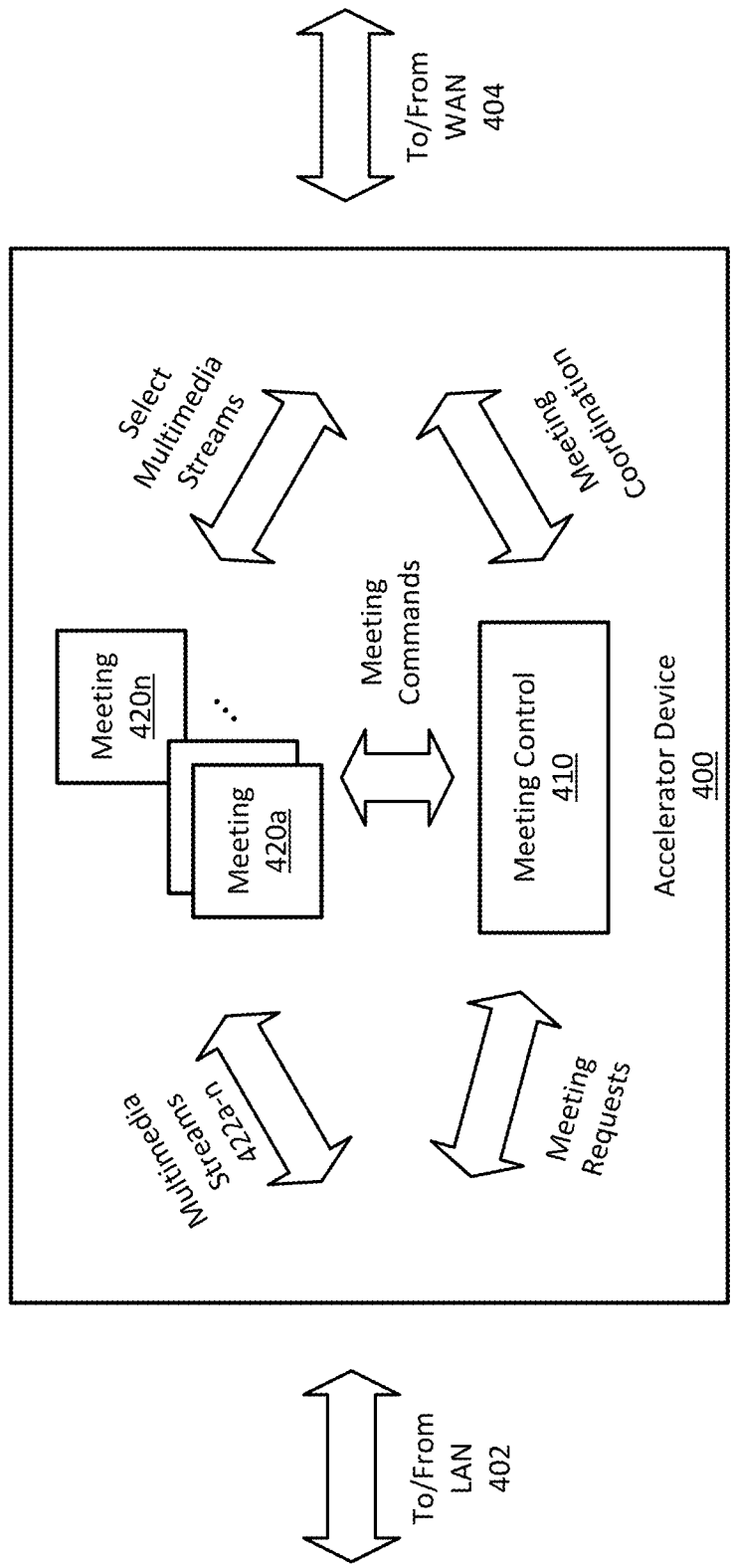
FIG. 4 shows an example accelerator device for video conference acceleration.

Referring now to FIG. 4, FIG. 4 shows an example data flow diagram for an accelerator device 400. The example accelerator device 400 includes a meeting control 410 software component that receives requests from client devices, e.g., client devices 350a-n, coordinates meetings with the video conference provider, e.g., video conference provider 310, and establishes, manages, and tears-down meetings 420a-n. In addition, the accelerator device 400 may host any number of simultaneous meetings 420a-n, depending on numbers of participants and network and computing resources. In some examples, the accelerator device 400 will be configured with limits, such as on the aggregate total number of simultaneous participants across all hosted meetings or on the total number of simultaneous meetings.

The meeting control 410 software component receives requests from client devices to host or join meetings and either creates a new meeting, in response to a request to host a meeting, or determines whether participant may join an existing meeting and, if so, provides access information to the existing meeting, which the client device can then join. In addition, when a new meeting is created, the meeting control 410 may instantiate a new instance of a meeting 420a-n software component to manage the new meeting. It should be appreciated that while multiple meetings 420a-n are depicted in the figure, it does not necessarily require that multiple meeting software components be installed on the accelerator device 400. Rather, in some examples, a single copy of a meeting software component 420 may be installed and executed or instantiated multiple times to provide for multiple simultaneous meetings 420a-n. Still further variations may be employed. For example, a single copy of a meeting software component 420 may be executed once and may create and manage all meetings handled by the accelerator device 400. When new meetings are created, the meeting control 410 software component communicates with the video conference provider via the WAN 404 to indicate that a new meeting has been created, to provide the access information to the meeting, such as a meeting identifier and passcode, and to provide other information about the meeting, such as the scheduled time and duration for the meeting, the maximum number of participants, the invited participants, etc.

In some examples, however, the meeting control 410 software component may receive such meeting information from the video conference provider. For example, if a meeting host has scheduled a meeting in advance with the video conference provider, and subsequently accesses the accelerator device 400 to host the meeting, the accelerator device 400 may request meeting information from the video conference provider, such as the meeting identifier and passcode, participant information (e.g., an invitation list), scheduled time and duration, etc. Thus, either the accelerator device 400 or the video conference provider may obtain the initial meeting configuration and subsequently provide it to the other entity, depending on the sequence by which the meeting was initially scheduled or created.

To begin a meeting, as mentioned above, the meeting control 410 software component instantiates a meeting 420a-n, which includes functionality to admit participants, receive and provide multimedia streams, create breakout rooms, record the meeting, etc., and other meeting-related functionality generally as described above with respect to FIGS. 1 and 2. Thus, the accelerator device 400 can function as an extension of a video conference provider and provide some or all of the same meeting functionality that meetings hosted by the video conference provider itself would provide.

In addition, the accelerator device 410 may simultaneously host multiple meetings 420a-n. For example, a convention center may simultaneously host multiple different conferences, each of which may employ video conferencing functionality and thus may use an available accelerator device 400 to host the various meetings. Each meeting may be created and managed generally as discussed above and while multiple meetings may be hosted by a single accelerator device, each meeting remains separate and distinct from every other meeting. Thus, meeting participants may be prevented from accessing meetings to which they have not been invited.

When a participant, via a client device, e.g., client devices 350a-n, attempts to join a meeting hosted by the accelerator device 400, the accelerator device 400 may attempt to authenticate the new participant generally as discussed above with respect to FIGS. 1 and 2. In some examples, the accelerator device 400 may communicate with the video conference provider to determine whether the participant has been invited to the meeting and is actually the participant they purport to be. For example, the accelerator device 400 may communicate with a user identity provider, e.g., user identity provider 215, or the video conference provider to authenticate a participant. Once a participant has been authenticated to join a requested meeting, the meeting control 410 software component may provide access information for the meeting via the LAN 402, such as access information to obtain one or more multimedia streams from the meeting and to provide multimedia streams to the meeting.

During the course of a meeting, the respective meeting 420a-n software components may receive and provide multimedia streams to the various participants via the LAN using techniques generally as described above with respect to FIGS. 1 and 2. In some examples, one or more participants may join a meeting hosted by an accelerator device 400 but are not connected to the LAN. In such examples, the video conference provider may accept meeting connections from such external client devices and coordinate with the accelerator device 400 to obtain certain multimedia streams from the meeting. For example, the accelerator device 400 may receive a notification from the video conference provider identifying one or more external client devices and a request for one or more multimedia streams for the meeting. The accelerator device 400 may then identify one or more multimedia streams to provide to the external clients via the video conference provider. For example, the accelerator device 400 may select multimedia streams sent by the meeting host and by the participant who is currently speaking or presenting.

In addition, the accelerator device 400 may indicate to the video conference provider whether any multimedia streams from the external clients should be provided to the accelerator device 400. In some examples, the video conference provider may provide multimedia stream information to the accelerator device to enable the accelerator device to access multimedia streams from the external clients. However, the video conference provider may not provide such multimedia streams unless the accelerator device specifically requests such multimedia streams (also referred to as "subscribing" to a multimedia stream). If the accelerator device 400 does not subscribe to an external client's multimedia stream, the video conference provider, in this example, does not transmit the multimedia stream to the accelerator device 400. To assist the accelerator device 400 in determining whether to subscribe to an external client's multimedia stream(s), the video conference provider may provide an indication to the accelerator device 400 if a participant connected via an external device begins talking or presenting content, e.g., presentation slides. In such an example, the accelerator device 400 (e.g., a corresponding meeting 420a-n hosted by the accelerator device 400) may determine to subscribe to the external client device's multimedia streams and receive those multimedia streams to be provided to the client devices connected to the LAN 402.

The accelerator device 400 described with respect to FIG. 4 includes a single computing device that includes the various software components discussed above. However, it should be appreciated that an accelerator device 400 may employ multiple computing devices. For example, an accelerator device 400 may employ one computing device to execute a meeting control 410 software component and one or more additional computing devices to execute meeting 420a-n software components to host individual meetings. Embodiments with multiple different computing devices may enable the use of relatively inexpensive computing devices to host meetings or to dedicate a computing device to handle a meeting with a large number of participants. Still other configurations are contemplated within the scope of this disclosure.

Figure 5:
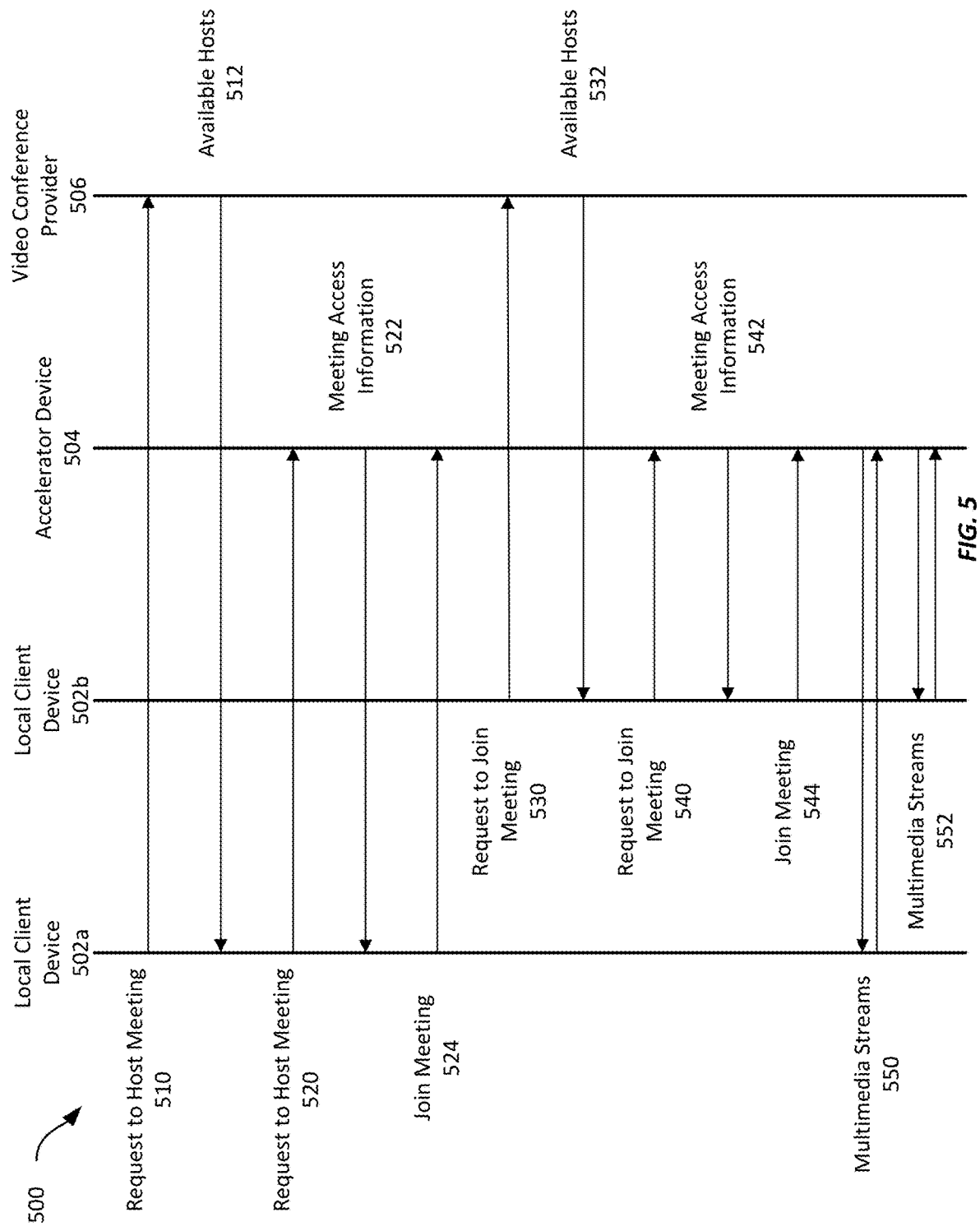
FIGS. 5-7 show example sequence diagrams for video conference acceleration.

Referring now to FIG. 5, FIG. 5 shows an example sequence diagram 500 for video conference acceleration. The sequence diagram illustrates an example sequence of events to host a meeting at an accelerator device by a local client device and to admit a second local client device to the meeting.

One client device 502a initially connects to the LAN at an event location, e.g., event location 302, and transmits a request to host a meeting 510 to the video conference provider 506. For example, the client device 502a may issue a hypertext transfer protocol ("HTTP") request to the video conference provider using a URL previously obtained by the meeting's host from the video conference provider. At this point, the client device 502a may not have received information that an accelerator device 504 is available to host the meeting. Alternatively, even if the client device 502a is aware of the accelerator device 504, the meeting may have been scheduled with the video conference provider 506 and include access information identifying the video conference provider 506 as the host system for the meeting.

Once the request 510 has been received by the video conference provider 506, the video conference provider 512 generates a list of available host devices to host the meeting and sends the list of available hosts 512 to the client device 502a. In this example, the video conference provider 506 may employ a large number of servers throughout a geographic region, generally as described above with respect to FIGS. 1 and 2. Thus, in general, the video conference provider 506 may generate such a list of available hosts to identify candidate servers for the client device to contact. In this example, the video conference provider 506 receives the request from the client device, which includes the client device's network address, e.g., its LAN network address or a WAN network address. The video conference provider 506 then accesses its data store to identify candidate servers to host the meeting. In doing so, it searches available accelerator devices to determine if any may be co-located with the client device 502a on the LAN. In this example, the video conference provider 506 identifies the accelerator device 504. Thus, the video conference provider 506 includes the accelerator device 504 in the list of available hosts. It may also include other hosts in other locations, e.g., in the event the accelerator device has reached its capacity or is experiencing an outage.

The client device 502a then transmits a request to host the meeting 520 to the accelerator device 504. To select the accelerator device 504 to host the meeting, the client device 502a performs network connectivity testing with one or more of the hosts identified in the list of available hosts received from the video conference provider. For example, the client device 502a may determine latency, jitter, packet loss, etc. statistics for communications between one or more hosts identified by the video conference provider. Because the accelerator device 504 is on the same LAN, e.g., LAN 320, as the client device 502a, the network performance is most likely substantially better than the other identified available hosts. Thus, the client device 502a selects the accelerator device 504 and transmits the request to host the meeting 520 to it.

The accelerator device 504 receives the request 520 from the client device 502a and establishes the meeting, such as by employing its meeting control 410 software component to instantiate a new meeting 420a-n and obtaining meeting access information from the meeting 420a-n, e.g., one or more available multimedia feeds or network address and port information to access the meeting. The accelerator device then provides the meeting access information 522 to the client device 502a.

In some examples, the accelerator device 504 may also transmit meeting access information to the video conference provider 506. The video conference provider 506 may associate such information with the accelerator device 504 in its data store, e.g., data store 312. Subsequent requests to join the meeting from local client devices received by the video conference provider 506 may cause the video conference provider 506 to identify the accelerator device 504 as the host device for the meeting.

After receiving the meeting access information 522, the client device 502a uses it to join the meeting 524.

Another local client device 502 may also attempt to join the meeting, either before or after it has been established at the accelerator device 504. To do so, it transmits a request to join the meeting 530 to the video conference provider 506. The client device 502b may issue the request 530 to the video conference provider 506 based on meeting information in a meeting invitation that identifies the video conference provider as the host for the meeting, e.g., as a uniform resource locator ("URL").

The video conference provider 506 receives the request 530 and identifies one or more hosts that the client device 502b may access to join the meeting. The video conference provider 506 then accesses its data store to identify any hosts that are already hosting the meeting, by which it identifies the accelerator device 504 as hosting the meeting. In addition, and as with the first client device 502a, the video conference provider 506 determines that the client device 502b is connected to the same LAN as the accelerator device 504. Thus, the video conference provider 506 identifies the accelerator device 504 as an available host. However, the video conference provider 506 may also identify other available hosts for similar reasons as discussed above, e.g., capacity or performance issues. The video conference provider 506 then transmits the list of available hosts 532 to the client device 502b.

The client device 502b performs network connectivity testing for one or more of the hosts, generally as described above, and identifies the accelerator device 504 as being the best candidate. It then issues a request to join the meeting 540 to the accelerator device.

As with client device 502, the accelerator device 504 may attempt to authenticate the user of the client device 502b as described above. It may then provide meeting access information 542 to the client device 502b.

The client device 502b then uses the meeting access information to join the meeting 544.

Once the respective client devices 502a-b have joined the meeting, they begin providing multimedia streams to the meeting, e.g., audio and video streams, and may receive multimedia streams from the meeting 550-552.

It should be appreciated that this sequence diagram provides an example with two local client devices 502a-b, however, any number of local client devices may access the meeting according to this example.

Figure 6:
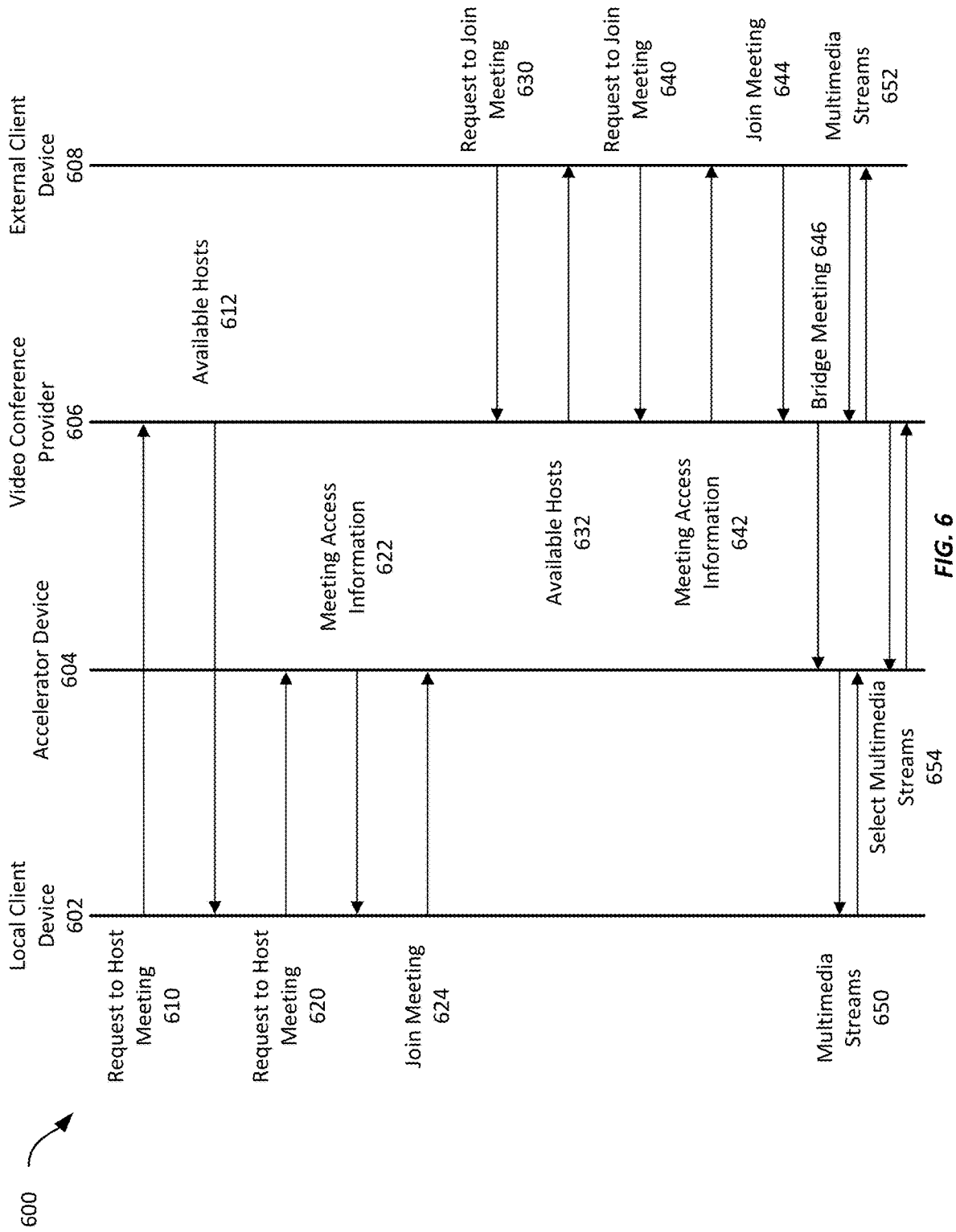

Referring now to FIG. 6, FIG. 6 shows an example sequence diagram 600 for video conference acceleration. The sequence diagram illustrates an example sequence of events to host a meeting at an accelerator device by a local client device and to admit an external client device to the meeting.

In this example, the local client device 602 hosts the meeting via the accelerator device 604 generally as described above with respect to FIG. 5 by first sending a request to host a meeting 610 to the video conference provider 606, which responds with a list of available hosts 612, including the accelerator device 604. The local client device 602 then sends the request to host the meeting 620 to the accelerator device 604, which provides meeting access information 622 to the local client device 602. The local client device then joins the meeting 624.

An external client device 608 may also attempt to join the meeting by transmitting a request to join the meeting 630 to the video conference provider 606. For example, the external client 608 may issue an HTTP request to the video conference provider 606 using a URL previously provided by the meeting's host.

In response, the video conference provider 606 sends a list of available hosts 632 to the external client device 608, generally as described above. However, because the external client device 608 is not connected to the LAN used by the local client device 602 and the accelerator device 604, the accelerator device 604 is not provided as an available host.

The external client device 608 then selects one of the hosts based on various performance characteristics, generally as described above, and sends a request to the video conference provider 606 to join the meeting, specifying the selected host.

The host at the video conference provider 606 authenticates the participant, generally as described above, and, if the participant is authenticated, the video conference provider 606 sends meeting access information 642, which the external client device 608 uses to join the meeting 644 at the video conference provider 606 and begins exchanging multimedia streams 652 with the video conference provider 606.

In addition, the video conference provider 606 communicates with the accelerator device 604 to bridge the meeting 646 to the external client device 608. In this example, the video conference provider 606 notifies the accelerator device 604 that an external client device 608 has joined the meeting, and requests one or more multimedia streams from the accelerator device 604. The accelerator device 604 then selects one or more multimedia streams 654 to send to the video conference provider 606, such as the meeting host's multimedia streams, a current presenter's multimedia streams, etc. Further, the accelerator device 604 may obtain multimedia streams 654 from the video conference provider 606. For example, if the participant using the external client device 608 begins speaking, the video conference provider 606 may notify the accelerator device 604 of the external client device's multimedia streams and the accelerator device 604 may subscribe to those streams to distribute to the local client device 602 (and other local client devices on the LAN).

Thus, an external client device 608 is able to join a meeting hosted by the accelerator device 604, but does so using the video conference provider 606 as a bridge between the accelerator device 604 and the external client device 608. Such a technique may allow external clients to access meetings hosted by accelerator devices 604, but without overwhelming a WAN connection available to the accelerator device 604. And while this example only includes a single external client device 608, additional external client devices may join such meetings using similar techniques.

Figure 7:
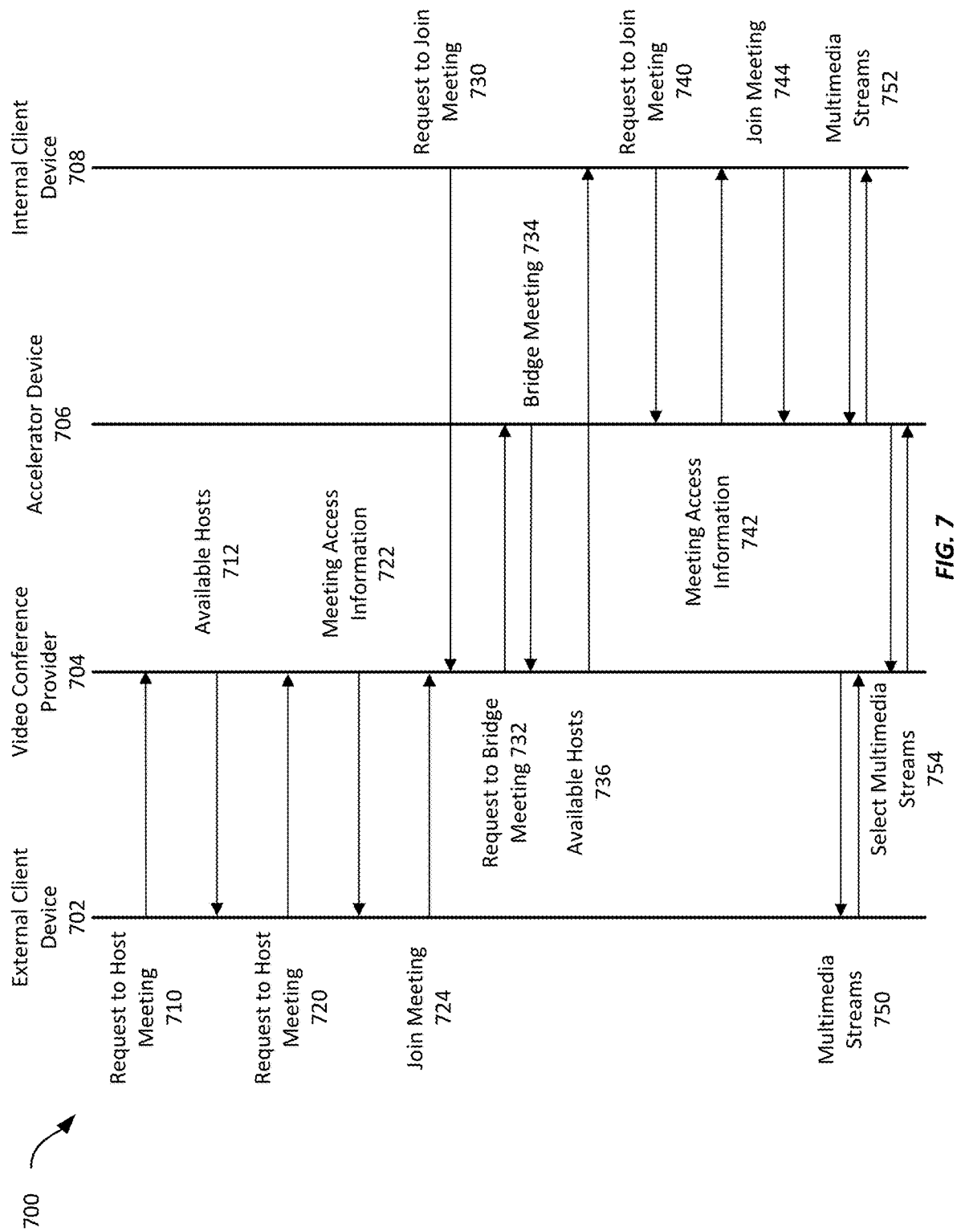

Referring now to FIG. 7, FIG. 7 illustrates an example sequence diagram 700 for video conference acceleration. This example sequence illustrates an external client device 702 initiating a meeting with the video conference provider 704 that an internal client device 708 joins, with the accelerator device 706 bridging the internal client device(s) to the meeting.

To initiate the meeting, the external client device 702 sends a request to host a meeting 710 to the video conference provider 704 and, in response, the video conference provider 704 provides a list of available hosts 712, generally as described above. The external client device 702 then sends the request to host the meeting 720 to a specific host at the video conference provider 704, which responds with meeting access information 722 to allow the external client device 702 to join the meeting 724.

In addition, the internal client device 708 sends a request to the video conference provider 704 to join the meeting 730. After receiving the request 730, the video conference provider 704 determines that the internal client device 708 is on the same LAN as accelerator device 706. The video conference provider 704 then sends a request to the accelerator device 706 to bridge the meeting 732 for the internal client device 708. The accelerator device 706 determines that it has available capacity to bridge the meeting and responds that it can bridge the meeting 734, and the video conference provider 704 and the accelerator device 706 coordinate to bridge the meeting. In response, the video conference provider 704 generates a list of available hosts that includes the accelerator device 706, generally as described above.

As discussed above, the internal client device 708 then selects the accelerator device 706, such as based on performance characteristics or determining that the accelerator device is on a common network and sends the request to join the meeting to the accelerator device 706, which authenticates the participant and responds with meeting access information 742. The internal client device 708 then uses the meeting access information 742 to join the meeting 744.

Once the internal client device 708 has joined the meeting, the accelerator device 706 or the video conference provider 704 selects one or more multimedia streams 754 to bridge between the video conference provider and the accelerator device 706. And while this example only includes a single internal client device 708, additional internal client devices may join such meetings using similar techniques.

Figure 8:
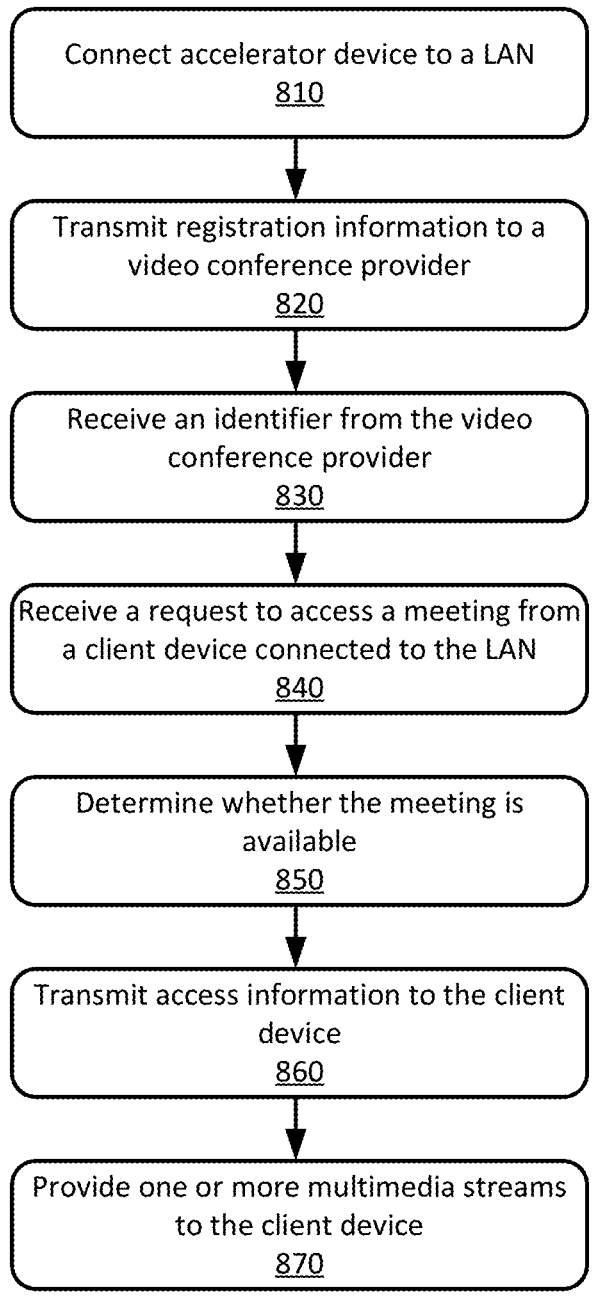
FIGS. 8-11 show example methods for video conference acceleration.

Referring now to FIG. 8, FIG. 8 shows an example method 800 for video conference acceleration. The method 800 shown in FIG. 8 will be described with respect to the system 300 shown in FIG. 3 and the accelerator device 400 shown in FIG. 4. However, it should be appreciated that any suitable system according to this disclosure may be used.

At block 810, the accelerator device 360 is connected to a LAN 320. For example, a computing device may be configured to include software components, e.g., meeting control 410 software components and meeting 420 software components. A communications interface of the computing device may be connected to the LAN 320, such as by using one or more Ethernet cables, one or more fiber optic cables, or one or more wireless interfaces, e.g., Wi-Fi.

At block 820, the accelerator device 360 transmits registration information to the video conference provider 310. As discussed above, an accelerator device 360 may transmit information to the video conference provider 310, such as its LAN network address, configuration information about the software components installed on the accelerator device, etc.

At block 830, the accelerator device 360 receives an identifier corresponding to the accelerator device 360 from the video conference provider 310. In this example, the identifier is a numeric token, though as discussed above, any suitable identifier may be employed, including cryptographic identifiers or cryptographic information to encrypt identification information.

At block 840, the accelerator device 360 receives a request to access a meeting from a client device, e.g., client device 350a, connected to the LAN 320. In this example, the request includes a meeting identifier and a passcode, though any suitable request may be employed.

At block 850, the accelerator device 360 determines whether the meeting is available at the accelerator device. The accelerator device 360 determines whether an existing meeting 420a-n matches information received as a part of the request to access the meeting. If so, the method 800 may proceed to block 860. However, in some examples, the accelerator device 360 may make additional determinations, such as whether the accelerator device 360 has sufficient capacity to admit an additional participant to the meeting. If so, the method 800 may proceed to block 860; otherwise, the accelerator device 360 may provide a response to the client device 350a to contact a different host to access the meeting. In some examples the request to access the meeting may include a request to host a new meeting. In response, the accelerator device 360 may determine whether it has capacity to host the meeting and, if so, it may create a new meeting based on the request. If the accelerator device creates a new meeting, it may transmit information to the video conference provider 310 indicating a new meeting has been started and include information to enable external client devices to access the meeting.

At block 860, the accelerator device transmits access information to the client device 350a. The access information may identify a network address or network port through which to join the meeting at the accelerator device 360. In some examples, the access information may include participant information, host information, access information for a waiting room to join the meeting, etc. After transmitting the access information, the client device 350a may join the meeting 420a-n, such as by subscribing to one or more multimedia streams provided by the meeting 420a-n.

At block 870, the accelerator device 360 provides one or more multimedia streams to the client device 350a. For example, the corresponding meeting 420a-n may receive from the various client devices and distribute those multimedia streams using the LAN.

It should be appreciated that the method 800 described above may be repeated as additional local client devices attempt to connect to the meeting. Further, as multiple client devices connect to the meeting, the accelerator device may receive and distributed multimedia streams to the various client devices, generally as described above, e.g., with respect to FIGS. 1-3.

Figure 9:
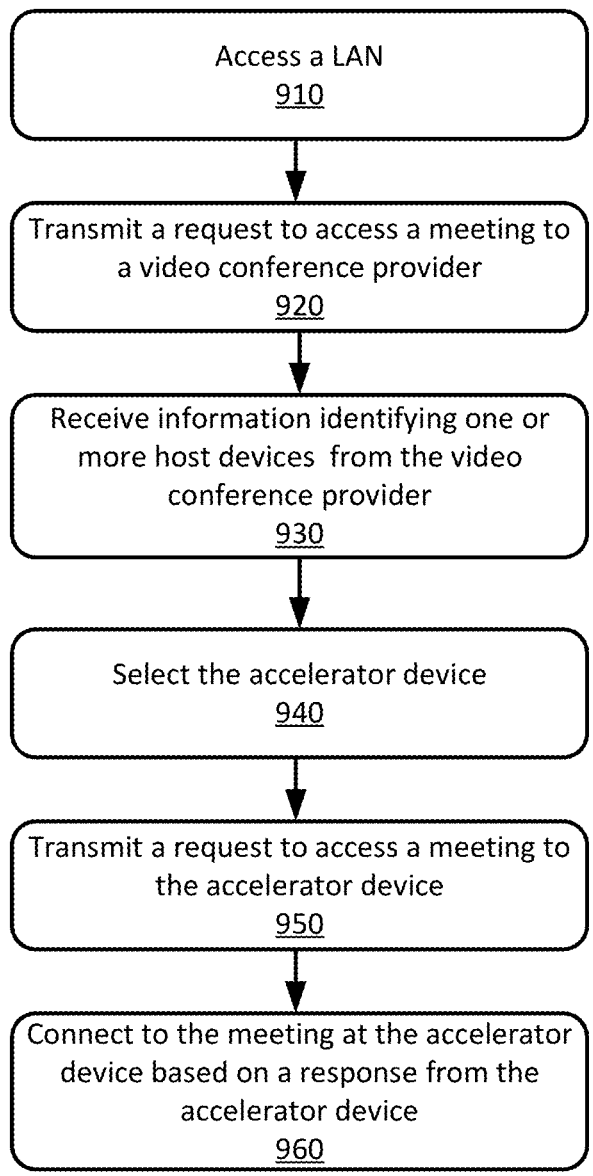

Referring now to FIG. 9, FIG. 9 shows an example method 900 for video conference acceleration. The method 900 shown in FIG. 9 will be described with respect to the system 300 shown in FIG. 3 and the accelerator device 400 shown in FIG. 4. However, it should be appreciated that any suitable system according to this disclosure may be used.

At block 910, a local client device, e.g., client device 350a, accesses a LAN 320. The local client devices 350a-n may access the LAN using any suitable communications interface, whether wired or wireless.

At block 920, the local client device 350a transmits a request to access a meeting to a video conference provider via the LAN 320 and a WAN 330, generally as described above with respect to FIGS. 3 and 5-7.

At block 930, the local client device 350a receives information identifying one or more host devices from the video conference provider 310. As discussed above, the video conference provider 310 may provide information identifying multiple candidate hosts to the client device, which may then select a suitable host through which to join the meeting. In this example, the video conference provider 310 has determined that an accelerator device 360 is connected to the LAN 320 and includes the accelerator device 360 as a candidate host in the information sent to the client device 350a.

At block 940, the client device 350a selects the accelerator device 360 from the candidate hosts based on network performance criteria, such as those discussed above.

At block 950, the client device 350a transmits a request to access the meeting to the accelerator device 360, generally as described above with respect to FIGS. 3-7.

At block 960, the client device 350a connects, via the LAN, to the meeting at the accelerator device 360 based on a response from the accelerator device. For example, as discussed above with respect to block 860, the accelerator device 360 may provide meeting access information to the client device 350a to enable the client device 350a to access the meeting.

Figure 10:
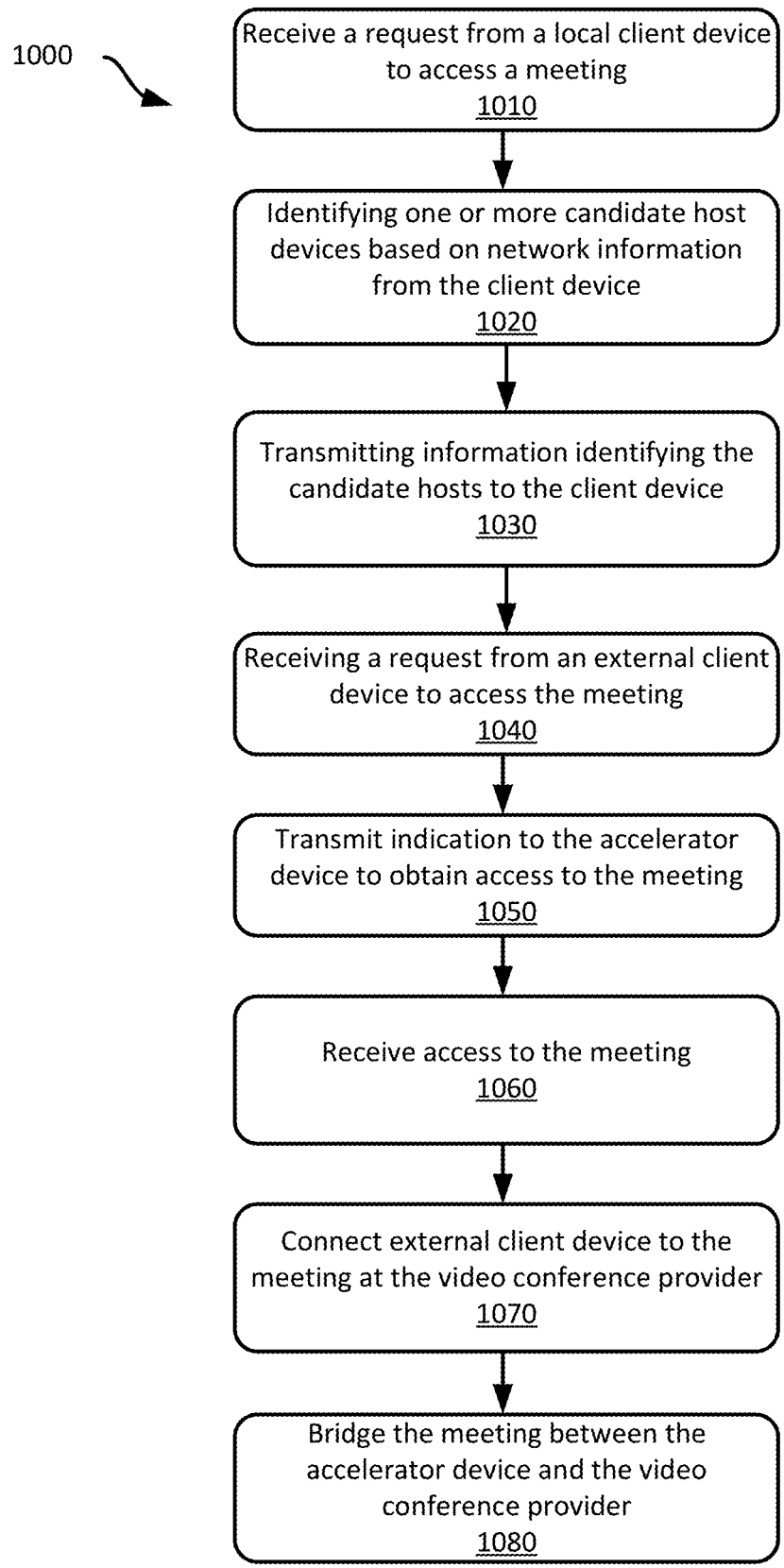

Referring now to FIG. 10, FIG. 10 shows an example method 1000 for video conference acceleration. The method 1000 shown in FIG. 10 will be described with respect to the system 300 shown in FIG. 3 and the accelerator device 400 shown in FIG. 4. However, it should be appreciated that any suitable system according to this disclosure may be used.

At block 1010, the video conference provider 310 receives a request to access a meeting from an internal client device 350a, generally as described above.

At block 1020, the video conference provider 310 identifies one or more candidate host devices for the meeting based on network information received from the client device 350a, the candidate host devices including an event accelerator. For example, as discussed above, the client devices 350a-n may provide their respective local network addresses along with the request to access the meeting. The video conference provider 310 may determine that the meeting is being hosted by the accelerator device 360 based on the received network information and may identify the accelerator device 360 as a candidate host. The video conference provider 310 may also identify additional candidate hosts, which may provide alternative hosts if the accelerator device 360 is at capacity or otherwise unavailable.

At block 1030, the video conference provider 310 transmits information identifying the one or more candidate hosts to the client device 350a. The client device 350a may then use such information to access the meeting at the accelerator device 360 generally as discussed above.

At block 1040, the video conference provider 310 receives a request from an external client device, e.g. external client device 370a, to access the meeting. The video conference provider 310 may then determine that the identified meeting is being hosted by the event accelerator, generally as described above.

At block 1050, the video conference provider 310 transmits an indication to the event accelerator, the indication including information to obtain access to the meeting for the second client device. For example, the video conference provider may transmit the indication to establish a bridge between the accelerator device 360 and the video conference provider 310 to allow multimedia streams to transfer between the two systems.

At block 1060, the video conference provider 1060 receives access to the meeting from the accelerator device 360. For example, the video conference provider 310 may receive information to subscribe to one or more multimedia streams provided by the accelerator device 360.

At block 1070, the video conference provider 310 connects the external client device 370a to the meeting at the video conference provider. In this example, the video conference provider 310 provides information to enable the external client device to subscribe to multimedia streams provided by the video conference provider 310 that may include multimedia streams received from the accelerator device 360. In addition, the video conference provider 310 may receive one or more multimedia streams from the external client device 370a.

At block 1080, the video conference provider 310 bridges the meeting between the event accelerator and the video conference provider to provide one or more multimedia streams from the meeting to the second client device. In addition, the video conference provider 310 may also provide one or more multimedia streams from the external client device 370a to the accelerator device 360, which may then distribute them to one or more of the local client devices 350a-n.

It should be appreciated that the method 1000 described above may be repeated as additional external client devices attempt to connect to the meeting.

Figure 11:
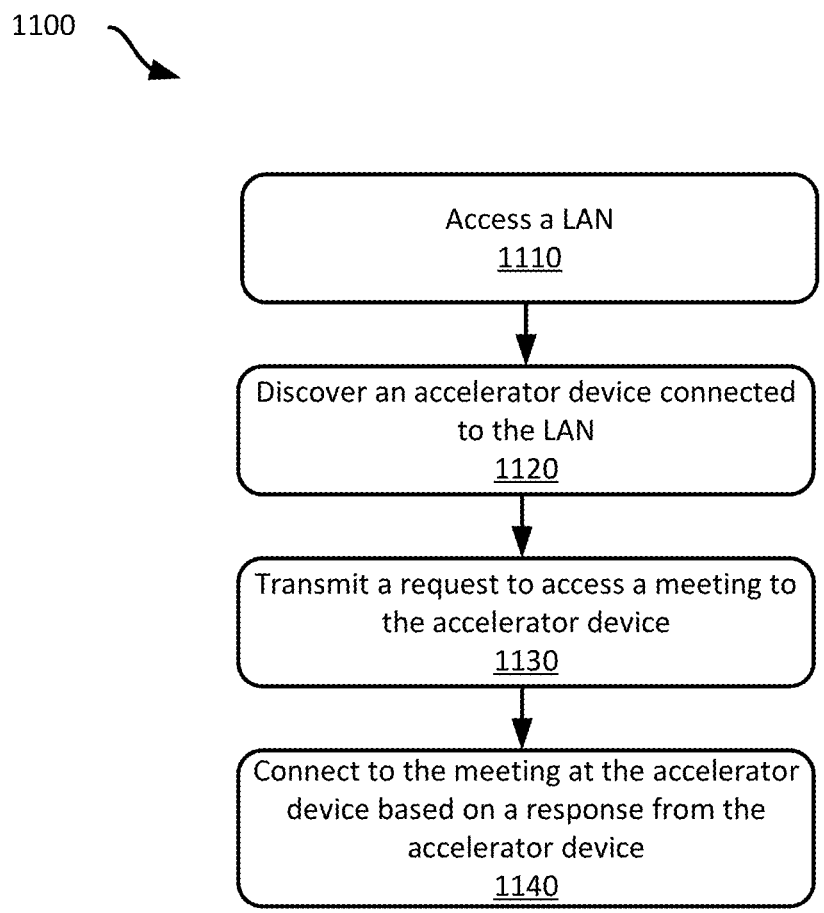

Referring now to FIG. 11, FIG. 11 shows an example method 1100 for video conference acceleration. The method 1000 shown in FIG. 10 will be described with respect to the system 300 shown in FIG. 3 and the accelerator device 400 shown in FIG. 4. However, it should be appreciated that any suitable system according to this disclosure may be used.

At block 1110, a client device, e.g., client device 350a, accesses a LAN 320, generally as described above with respect to block 910 of FIG. 9.

At block 1120, the client device 350a discovers an accelerator device 360 connected to the LAN 320. For example, the client device 350a transmit a request to access a meeting the video conference provider 310 and receive, in response, a list of available hosts that includes the accelerator device 360, such as described above with respect to blocks 920-940. In some examples, however, the client device 350a may transmit a request on the LAN requesting a response from any available accelerator device 360, such as by transmitting a multi-cast request. Further, in some examples, the client device 350a may transmit a request to a name server on the LAN for any available accelerator device, e.g., by sending a DNS request.

At block 1130, the client device 350a transmits a request to access a meeting to the accelerator device 360, generally as described above with respect to block 950.

At block 1140, the client device 350a connects to the meeting at the accelerator device based on a response from the accelerator device, generally as discussed above with respect to block 960.

Referring now to FIG. 12, FIG. 12 shows an example computing device 1200 suitable for use in example systems or methods for video conference acceleration according to this disclosure. The example computing device 1200 includes a processor 1210 which is in communication with the memory 1220 and other components of the computing device 1200 using one or more communications buses 1202. The processor 1210 is configured to execute processor-executable instructions stored in the memory 1220 to perform one or more methods for video conference acceleration according to different examples, such as part or all of the example methods 800-1100 described above with respect to FIGS. 8-11. The computing device, in this example, also includes one or more user input devices 1250, such as a keyboard, mouse, touchscreen, microphone, etc., to accept user input. The computing device 1200 also includes a display 1240 to provide visual output to a user.

In some examples, the computing device 1200 may be configured to operate as an accelerator device by including event accelerator 1260 functionality. Such functionality may be implemented according to various examples according to this disclosure, such as the example accelerator device 400 shown in FIG. 4.

The computing device 1200 also includes a communications interface 1240. In some examples, the communications interface 1230 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   connecting, by an accelerator device, to a local area network ("LAN"), the LAN in communication with a wide area network ("WAN");
   transmitting, via the LAN and the WAN, registration information to a video conference provider, the registration information identifying network configuration information;
   receiving, from the video conference provider via the WAN and the LAN, an identifier corresponding to the accelerator device;
   after receiving the identifier, receiving, from a first client device, a request to access a meeting hosted by the video conference provider;
   determining whether the meeting is available at the accelerator device;
   in response to determining that the meeting is available at the accelerator device, transmitting access information to the first client device, the access information enabling access to the meeting at the accelerator device;
   joining the first client device to the meeting at the accelerator device;
   receiving, via the LAN, audio or video streams from client devices joined to the meeting at the accelerator device via the LAN;
   distributing, via the LAN, the audio or video streams to the client devices connected to the accelerator device via the LAN;
   receiving, from the video conference provider, information indicating a new participant has joined the meeting, the new participant associated with a client device not connected to the LAN; and
   in response to receiving the information indicating the new participant has joined the meeting, transmitting one or more audio or video streams to the video conference provider, the one or more audio or video streams associated with the meeting.

2. The method of claim 1, further comprising:
   initiating a new meeting in response to receiving the request to access the meeting; and
   providing meeting information associated with the meeting to the video conference provider.

3. The method of claim 1, further comprising:
   receiving, from a plurality of client devices via the LAN, requests to access the meeting, each client device of the plurality of client devices connected to the LAN;
   connecting each client device of the plurality of client devices to the meeting;
   receiving, via the LAN, video or audio streams from at least some of the client devices of the plurality of client devices; and
   distributing, via the LAN, at least a subset of the video or audio streams to one or more client devices of the plurality of client devices.

4. The method of claim 1, further comprising:
   receiving, from the video conference provider, one or more new audio or video streams from the new participant; and
   providing, to one or more client devices of the plurality of client devices via the LAN, at least one of the one or more new audio or video streams from the new participant.

5. The method of claim 1, wherein the meeting is a first meeting, and further comprising:
   after receiving the identifier, receiving, from a second client device, a request to access a second meeting, the second meeting different from the first meeting, the second meeting concurrent with the first meeting;
   determining whether the second meeting is available at the accelerator device; and
   in response to determining that the second meeting is available at the accelerator device, transmitting second access information to the second client device.

6. The method of claim 5, wherein the second client device is different from the first client device.

7. The method of claim 1, further comprising:
   initiating a new meeting in response to receiving the request to access the meeting; and
   providing meeting information associated with the meeting to the video conference provider.

8. A system comprising:
   a non-transitory computer-readable medium;
   a communications interface; and
   one or more processors in communication with the non-transitory computer-readable medium, the one or more processors configured to execute processor-executable instructions stored in the non-transitory computer-readable medium to:
   connect to a local area network ("LAN"), the LAN in communication with a wide area network ("WAN");
   transmit, via the LAN and the WAN, registration information to a video conference provider, the registration information identifying network configuration information;
   receive, from the video conference provider via the WAN and the LAN, an identifier corresponding to an accelerator device;
   after receipt of the identifier, receive, from a first client device, a request to access a meeting;
   determine whether the meeting is available at the accelerator device; and
   in response to a determination that the meeting is available at the accelerator device, transmit access information to the first client device, the access information enabling access to the meeting at the accelerator device;
   join the first client device to the meeting at the accelerator device;
   receive audio or video streams from client devices joined to the meeting at the accelerator device;
   distribute the audio or video streams to the client devices connected to the accelerator device;

receive, from the video conference provider, information indicating a new participant has joined the meeting, the new participant associated with a client device not connected to the LAN; and in response to receiving the information indicating the new participant has joined the meeting, transmit one or more audio or video streams to the video conference provider, the one or more audio or video streams associated with the meeting.

9. The system of claim 8, wherein the one or more processors are configured to execute further processor-executable instructions stored in the non-transitory computer-readable medium to:

initiate a new meeting in response to receiving the request to access the meeting; and provide meeting information associated with the meeting to the video conference provider.

10. The system of claim 8, wherein the one or more processors are configured to execute further processor-executable instructions stored in the non-transitory computer-readable medium to:

receive, from a plurality of client devices via the LAN, requests to access the meeting, each client device of the plurality of client devices connected to the LAN;

connect each client device of the plurality of client devices to the meeting;

receive, via the LAN, video or audio streams from at least some of the client devices of the plurality of client devices; and distribute, via the LAN, at least a subset of the video or audio streams to one or more client devices of the plurality of client devices.

11. The system of claim 8, wherein the one or more processors are configured to execute further processor-executable instructions stored in the non-transitory computer-readable medium to:

receive, from the video conference provider, one or more new audio or video streams from the new participant; and provide, to one or more client devices of the plurality of client devices via the LAN, at least one of the one or more new audio or video streams from the new participant.

12. The system of claim 8, wherein the meeting is a first meeting, and wherein the one or more processors are configured to execute further processor-executable instructions stored in the non-transitory computer-readable medium to:

after receipt of the identifier, receive, from a second client device, a request to access a second meeting, the second meeting different from the first meeting, the second meeting concurrent with the first meeting;

determine whether the second meeting is available at the accelerator device; and in response to a determination that the second meeting is available at the accelerator device, transmit second access information to the second client device.

13. The system of claim 12, wherein the second client device is different from the first client device.

14. The system of claim 8, wherein the one or more processors are configured to execute further processor-executable instructions stored in the non-transitory computer-readable medium to:

initiate a new meeting in response to receiving the request to access the meeting; and provide meeting information associated with the meeting to the video conference provider.

15. A non-transitory computer-readable medium comprising processor-executable instructions configured to cause one or more processors to:

connect to a local area network ("LAN"), the LAN in communication with a wide area network ("WAN");

transmit, via the LAN and the WAN, registration information to a video conference provider, the registration information identifying network configuration information;

receive, from the video conference provider via the WAN and the LAN, an identifier corresponding to an accelerator device;

after receipt of the identifier, receive, from a first client device, a request to access a meeting;

determine whether the meeting is available at the accelerator device; and in response to a determination that the meeting is available at the accelerator device, transmit access information to the first client device, the access information enabling access to the meeting at the accelerator device;

join the first client device to the meeting at the accelerator device;

receive audio or video streams from client devices joined to the meeting at the accelerator device;

distribute the audio or video streams to the client devices connected to the accelerator device;

receive, from the video conference provider, information indicating a new participant has joined the meeting, the new participant associated with a client device not connected to the LAN; and in response to receiving the information indicating the new participant has joined the meeting, transmit one or more audio or video streams to the video conference provider the one or more audio or video streams associated with the meeting.

16. The non-transitory computer-readable medium of claim 15, further comprising processor-executable instructions configured to cause one or more processors to:

initiate a new meeting in response to receiving the request to access the meeting; and provide meeting information associated with the meeting to the video conference provider.

17. The non-transitory computer-readable medium of claim 15, further comprising processor-executable instructions configured to cause one or more processors to:

receive, from a plurality of client devices via the LAN, requests to access the meeting, each client device of the plurality of client devices connected to the LAN;

connect each client device of the plurality of client devices to the meeting;

receive, via the LAN, video or audio streams from at least some of the client devices of the plurality of client devices; and distribute, via the LAN, at least a subset of the video or audio streams to one or more client devices of the plurality of client devices.

18. The non-transitory computer-readable medium of claim 15, further comprising processor-executable instructions configured to cause one or more processors to:

receive, from the video conference provider, one or more new audio or video streams from the new participant; and provide, to one or more client devices of the plurality of client devices via the LAN, at least one of the one or more new audio or video streams from the new participant.

19. The non-transitory computer-readable medium of claim 15, wherein the meeting is a first meeting, and further comprising processor-executable instructions configured to cause one or more processors to:
- after receipt of the identifier, receive, from a second client device, a request to access a second meeting, the second meeting different from the first meeting, the second meeting concurrent with the first meeting;
- determine whether the second meeting is available at the accelerator device; and
- in response to a determination that the second meeting is available at the accelerator device, transmit second access information to the second client device.

20. The non-transitory computer-readable medium of claim 15, further comprising processor-executable instructions configured to cause one or more processors to:
- initiate a new meeting in response to receiving the request to access the meeting; and
- provide meeting information associated with the meeting to the video conference provider.

* * * * *